US008924722B2

(12) United States Patent
Horn et al.

(10) Patent No.: US 8,924,722 B2
(45) Date of Patent: Dec. 30, 2014

(54) APPARATUS, METHOD, SYSTEM AND PROGRAM FOR SECURE COMMUNICATION

(75) Inventors: Guenther Horn, München (DE); Peter Schneider, Holzkirchen (DE)

(73) Assignee: Nokia Siemens Networks Oy, Espoo (FI)

(*) Notice: Subject to any disclaimer, the term of this patent is extended or adjusted under 35 U.S.C. 154(b) by 445 days.

(21) Appl. No.: 12/865,162

(22) PCT Filed: Apr. 7, 2008

(86) PCT No.: PCT/EP2008/054181
§ 371 (c)(1),
(2), (4) Date: Jul. 29, 2010

(87) PCT Pub. No.: WO2009/124583
PCT Pub. Date: Oct. 15, 2009

(65) Prior Publication Data
US 2011/0004757 A1  Jan. 6, 2011

(51) Int. Cl.
*H04L 9/32* (2006.01)
*H04L 29/06* (2006.01)

(52) U.S. Cl.
CPC .................. *H04L 63/062* (2013.01)
USPC ....................................... 713/168

(58) Field of Classification Search
USPC ....................................... 713/168
See application file for complete search history.

(56) References Cited

U.S. PATENT DOCUMENTS

| 6,049,878 | A | * | 4/2000 | Caronni et al. | 726/3 |
| 7,035,410 | B1 | * | 4/2006 | Aiello et al. | 380/247 |
| 7,069,451 | B1 | * | 6/2006 | Ginter et al. | 705/51 |
| 2006/0165060 | A1 | * | 7/2006 | Dua | 370/352 |
| 2007/0195956 | A1 | * | 8/2007 | Gavette | 380/277 |
| 2010/0268937 | A1 | * | 10/2010 | Blom et al. | 713/153 |

FOREIGN PATENT DOCUMENTS

WO    WO 00/52905    9/2000

OTHER PUBLICATIONS

Andreasen et al, Session Description Protocol (SDP) Security Descriptions for Media Streams, Jul. 2006, The Internet Society.*
Andreasen, F., et al, "Session Description Protocol (SDP) Security Descriptions for Media Streams", © 2006, The Internet Society, 52 pgs., RFC-4568.
Dierks, T., et al., "The Transport Layer Security (TLS) Protocol, Version 1.1", © 2006, The Internet Society, 87 pgs., RFC-4346.
Housley, R., "Use of the RSAES-OAEP Key Transport Algorithm in the Cryptographic Message Syntax (CMS)", © 2003, The Internet Society, 18 pgs., RFC-3560.
Kaufman, C., "Internet Key Exchange (IKEv2) Protocol", © 2005, The Internet Society, 100 pgs., RFC-4306.
Kent, S., "IP Authentication Header", © 2005, The Internet Society, 35 pgs., RFC-4302.
Rosenberg, et al., "An Offer/Answer Model with the Session Description Protocol (SDP)", © 2002, The Internet Society, 20 pgs., RFC-3264.
Baugher, M., et al., "The Secure Real-time Transport Protocol (SRTP)", © 2004, The Internet Society, 57 pgs., RFC-3711.
Handley, M., et al., "SDP: Session Description Protocol", © 2006, The Internet Society, 50 pgs., RFC-4566.
Ignjatic, D., et al., "MIKEY-RSA-R: An Additional Mode of Key Distribution in Multimedia Internet KEYing (MIKEY)" © 2006, The IETF Trust, 20 pgs., RFC-4738.
Kent, S., "Extended Sequence Number (ESN) Addendum to IPsec Domain of Interpretation Security Association and Key Management Protocol (ISAKMP)", © 2005, The Internet Society, 6 pgs., RFC-4304.
Kent, S., et al., "Security Architecture for the Internet Protocol", © 2005, The Internet Society, 102 pgs., RFC-4301.
Rosenberg, J., et al., "SIP: Session Initiation Protocol", © 2002, The Internet Society, 202 pgs., RFC-3261.
Wing, D., et al., "Requirements and Analysis of Media Security Management Protocols draft-ietf-sip-media-secuirty-requirements-04", Mar. 20, 2008, SIP Working Group, 50 pgs.

* cited by examiner

*Primary Examiner* — Brian P Whipple
(74) *Attorney, Agent, or Firm* — Harrington & Smith

(57) ABSTRACT

Embodiments provide an apparatus, method, product and storage medium for secure communication, wherein a message is sent over a secure signalling path to a recipient, the message including a value indicating a key for encrypting or decrypting information for secure communication, or a key derivation value for deriving a key. The message further includes an indication indicating the type of usage of the value. The receiver of the message may return a message which also includes a key or key derivation value and an indication indicating the type of key or type of usage of the value.

24 Claims, 10 Drawing Sheets

| Mode # | 1 | 2 | 3 | 4 | 5 | 6 | 7 | 8 |
|---|---|---|---|---|---|---|---|---|
| Caller uses | sendkey | nonce | nonce | bothkeys | nothing | bothkeys | reckey | reckey |
| Called endpoint uses | sendkey | nonce | sendkey | nothing | bothkeys | sendkey | reckey | bothkeys |
| forking/retargeting: non responding parties do not get: | | | | | | | | |
| - the callers sending key | no | yes | yes | no | yes | no | yes | yes |
| - the called parties sending keys | yes | yes | yes | no | yes | yes* | no | yes* |
| Efficient multicast supported for: | | | | | | | | |
| - the caller | yes | no | no | yes | no | yes | no | no |
| - the called party | yes | no | yes | no | yes | yes | no | yes |
| Support of early media | no | no | no | yes | no | yes | yes | yes |

*: Two keys are used successively, one for early media, one afterwards. Not responding parties will not get the second one.

Fig. 4

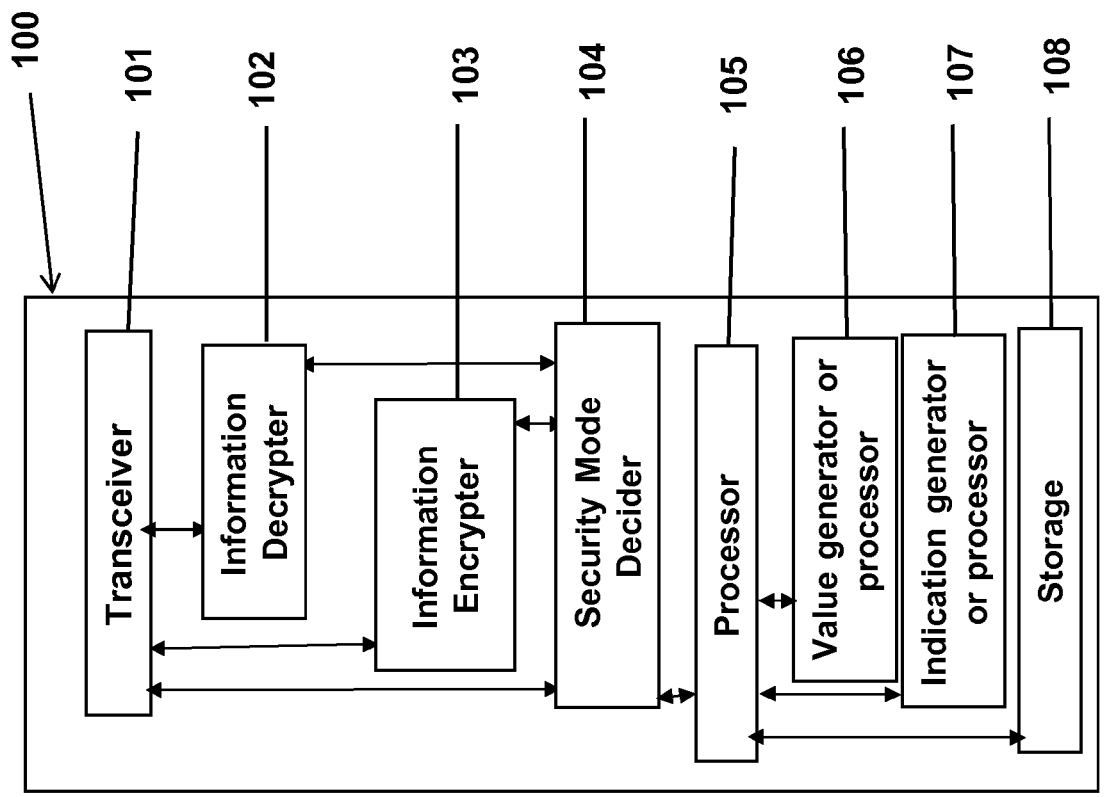

APPARATUS, METHOD, SYSTEM AND PROGRAM FOR SECURE COMMUNICATION

FIELD OF TECHNOLOGY AND BACKGROUND

The invention generally relates to communication and network elements, methods, apparatuses, systems and programs e.g. for securing communication or data connection etc, using cryptograhic keys.

To secure communication over networks, cryptographic algorithms may be used. Symmetrical cryptographic algorithms may use a value called key (for example a string of e.g. 128 bits) to perform operations on the information to be secured.

Such operations may encrypt the information and/or compute a message authentication code for e.g. a message or more generally a piece of the information. Only parties in possession of the key are able to decrypt the information, or to verify the message authentication code, which ensures that the information has not been altered during transport and has been composed by a party in possession of the key.

Depending on the cryptographic algorithm, sometimes more than one key may be necessary to protect the communication. As an example, a key may be provided for encryption and another key for authentication. There are mechanisms that allow deriving several keys from a single key, sometimes called master key. One example is a secure transport protocol such as a real-time transport protocol, SRTP, e.g. according to RFC3711. Here, a (secret) 128 bit master key and a (not necessarily secret) 112 bit so called master salt are used to derive several keys needed to apply encryption and authentication to a communication based on a real-time transport protocol plus a real-time transport control protocol (e.g. according to RFC3560). Key derivation can be done using pseudo random functions or hash functions. For a given input, such functions produce an output which cannot be computed by a party that does not know the full input. Different keys can be derived from a master key by applying such a function to different strings composed from different constants and the master key. Various pseudo random functions and hashfunctions are described in the literature and in standardization documents such as a function PRF_n in RFC3711.

For securing communication between two parties with symmetrical cryptography, at least one key is established between the parties. The two parties agree on a common key to be used. Reusing such a key over and over may allow attackers to find ways to break the key, so this key should be changed often. Mostly, at the beginning of a new communication session, a new common key may be established.

Using one master key to derive keys to secure different traffic flows (e.g. within a point-to-point voice call, the flow from party A to B as well as the flow from party B to A) may expose the encryption to certain attacks. E.g. in SRTP, a so called "SSRC collision" may happen, leading to a so called "two-time-pad" which may allow an attacker that has access to the encrypted communication to break the encryption (see RFC3560 and RFC3711 for a description.) In such cases, usage of different master keys for the traffic of different senders is more secure. So, in a point-to-point voice call using SRTP, two master keys may be established, one for the flow from party A to B and another master key for the flow from party B to A.

Many procedures have been described how to establish a common key over an insecure network. Some of them require that communicating parties have a "preshared key", i.e. a common secret established "offline", others require public key cryptography and a public key infrastructure, PKI, where communicating parties own so called "public/private key" pairs, and trusted third parties certify the identity of the owners of key pairs. Approaches relying on shared keys do not scale. The PKI approach, on the other hand, is a "heavy weight" approach that requires much effort. A PKI for servers, e.g. WWW servers, exists in the current Internet. Its effectiveness suffers considerably from the fact that end users mostly cannot know whether they can trust a given certificate authority. PKIs comprising public/private key pairs for each end user have not been deployed in a large scale up to now. Public key cryptography typically comprises expensive computations, which might be undesirable on certain devices, like cell phones etc.

In an environment providing secure signalling allowing secure key exchange such as e.g. a scenario using a protocol for initiating a session such as session initiation protocol, SIP, a number of key exchange mechanisms have been proposed as described in Requirements and Analysis of Media Security Management Protocols, D. Wing, Ed., "draft-ietf-sip-media-security-requirements-04", Mar. 20, 2008.

A straightforward and light weighted approach is session description protocol, SDP, security descriptions (SDES, RFC4568). In SDES, a caller selects a master key for protecting the media traffic it is going to send and transmits this key in an INVITE message. A called party that accepts this invitation also selects a master key for protecting the media traffic it sends and transmits this key e.g. in a 200 OK message. This approach suffers from forking/retargeting problem; and a stream sent by the caller can be successfully attacked by endpoints that did not respond to the original INVITE. This approach does not support early media. A more detailed description of forking and retargeting can be found in the above literature.

A variant of the SOGS-approach has been described in a now expired interne draft (/LD-SDES-EMI), where me caller provides the master key also for the traffic sent by the called party. This approach is called "SOES-EM" in the field. EM stands for "early media", referring to the ability of the approach to support early media. This approach suffers from the forking/retargeting problem; the streams sent by the caller and by the endpoints that participate in the session can be successfully attacked by endpoints that did not respond to the original INVITE. An additional disadvantage of this approach is, that if the called party is a multicast sender (e.g. the caller dials into a media bridge), efficient multicast is not possible, as the multicast sender must use an individual key for the stream towards each caller.

Another approach is the one called "MIKEY-Null". The caller provides master keys for the flows in both directions. This is similar to SDES-EM, and it suffers from the same disadvantages.

Other approaches described in the above literature are less efficient, as they involve additional cryptography, in most cases even public cryptography and/or DH key exchanges. These approaches apply such techniques because they do not assume a secure signaling infrastructure. Note that some approaches do not use a signaling infrastructure at all but perform the key exchange over the insecure media path. Another weakness of some of these approaches is that they rely on shared secrets or public/private key pairs. In case of forking/retargeting, the session invitation may reach endpoints, where such credentials are not available, and the session establishment fails. It may be intended that the session establishment fails in this case; however, there are clearly scenarios, where the intention of the caller is to be able to reach whoever the call is forked or retargeted to, but still wishes to protect the call against other parties.

One of the approaches described in the above literature provides a mode, where the called party provides the master keys for both directions. It is called MIKEY-RSA-R and described in RFC4738. This approach uses public key cryptography for securing the transmission of the master keys. It supports forking and retargeting, and also a case where the called party is a multicast sender. If however the calling party is a multicast sender, efficient multicast is not possible. A more detailed description of multicast in a SIP environment can be found in the above literature where it is described as "shared key conferencing". Early media is not supported.

Some key exchange mechanisms involve a so called Diffie-Hellman (DH) key exchange, a procedure that allows to securely establish a common key between two parties even in the presence of attackers that monitor the complete key exchange. A DH key exchange requires expensive computations on both peers.

SUMMARY

In accordance with one or more embodiments of the invention, a flexible and light weight exchange mechanism for cryptographic keys is provided which allows good security and may be implemented without requiring expensive computations.

One or more embodiments of the invention relate to security such as media security e.g. in an internet-protocol based environment such as a multimedia system like e.g. an internet protocol based multimedia subsystem, e.g. IMS. Several alternative or different protocols may be used including protocols for initiating a session such as a session initiation protocol like SIP. In accordance with one or more embodiments of the invention SIP/IMS media security is provided.

Embodiment of the invention may be implemented in any arbitrary environment including e.g. a specific environment (e.g. an IP-based multimedia subsystem, IMS, according to third generation partnership project, 3GPP IMS or other) for establishing multimedia sessions.

Communicating endpoints may use a secure signaling infrastructure to establish master keys for securing multimedia sessions. In accordance with one or more embodiments of the invention, the keying mechanism is able to support at least one or all of forking/retargeting, efficient multicast and early media avoiding expensive cryptography and increased signaling traffic.

One or some embodiments of the invention provide a key exchange mechanism with several modes which can be selected for a specific session in a flexible way and may be implemented without needing complex computations so as to become a lightweight key exchange mechanism.

The mechanism allows e.g. the calling endpoints to transmit a value that may be used as a key such as a sending key or a receiving key or no key. Alternatively or additionally the value may be used as a part of an input to a key derivation mechanism for deriving e.g. a sending key or for deriving both a sending and receiving key. The endpoint may have means to indicate how the transmitted value may be used. A called endpoint, in its response, may also transmit such a value plus an indication how it may be used.

As an example, the value may be used as a key for protecting traffic to be sent to or from the recipient of the message. As another example the value may be used for generating a key for protecting traffic sent by the sender of the message or for generating a key for protecting traffic sent by the recipient of the message, or generating keys for both.

Protecting is to be understood in a general sense comprising e.g. at least one of encrypting, decrypting, generating an authentication and integrity information to be added to the communication or part of the communication such as a message, and checking an authentication and integrity information added to a communication or part of the communication such as a message.

In accordance with one or more embodiments of the invention a method for secure communication is provided which comprises sending a message over a secure signalling path to a recipient, the message comprising a value indicating a key for protecting information for secure communication, or a key derivation value for deriving at least one key for protecting information for secure communication, the message further comprising an indication indicating the type of usage of the value.

In accordance with another embodiment of the invention a method for secure communication is provided which comprises receiving a message over a secure signalling path from a sender, the message comprising a value indicating a key for protecting information for secure communication, or a key derivation value for deriving at least one key for protecting information for secure communication, the message further comprising an indication indicating the type of usage of the value.

In accordance with one or more embodiments of the invention the indication may indicate at least one of:
the value is to be used as key for protecting media traffic to be sent by the sender of the message,
the value is to be used as key for protecting media traffic to be received by the sender of the message,
the value is to be used as input to a key derivation function to derive a key for protecting media traffic to be sent by the sender of the message or to be received by the sender of the message,
the value is to be used as input to a key derivation function to derive keys for protecting media in sending and receiving directions,
no value is provided.

In accordance with one or more embodiments of the invention a receiver of the message may return a return message comprising a value indicating a key for protecting information for secure communication, or a key derivation value for deriving at least one key for protecting information for secure communication, the return message further comprising an indication indicating the type of usage of the value comprised in the return message.

In accordance with one or more embodiments of the invention a sender of the message may receive a return message comprising a value indicating a key for protecting information for secure communication, or a key derivation value for deriving at least one key for protecting information for secure communication, the return message further comprising an indication indicating the type of usage of the value comprised in the return message.

The indication comprised in the return message may indicate at least one of:
the value is to be used as master key for sending protecting media traffic to be sent by the sender of the return message,
the value is to be used as master key for receiving protecting media traffic from to be received by the sender of the return message,
the value is to be used as input to a key derivation function to derive a master key for sending protecting media traffic to be sent by the sender of the return message or to be received by the sender of the return message,
the value is to be used as input to a key derivation function to derive master keys for protecting media in sending and receiving directions,
no value is provided.

In accordance with one or more embodiments of the invention,
- a first message is sent or received which comprises an indication indicating that the value is to be used as an input to a key derivation function to derive a key, and a second message which is a return message, is received or sent which return message comprises an indication indicating that the value transmitted in the return message is to be used as an additional input to the key derivation function, whereby the key derivation function is used to derive two different keys to protect traffic in both directions; or
- a first message is sent or received which comprises an indication indicating that the value transmitted in this message is to be used as an input to a key derivation function to derive a key, and a second message which is a return message is received or sent which comprises an indication indicating that the value transmitted in the second, return message is to be used on the one hand as an additional input to the key derivation function to derive a key to protect traffic sent to the sender of the second, return message, and on the other hand as a key to protect traffic sent by the sender of the return message, or
- a first message is sent or received which comprises an indication indicating that no value is transmitted in this message, and a second, return message is received or sent which comprises an indication indicating that a value transmitted in the return message is to be used as an input to a key derivation function to derive two different keys to protect traffic in both directions, or
- a first message is sent or received which comprises an indication indicating that the value transmitted in this message is to be used as an input to a key derivation function to derive keys to protect traffic in both directions, and a second, return message is received or sent which comprises an indication indicating that a value transmitted in the second, return message is to be used as a key to protect traffic sent by the sender of the second, return message, wherein this key replaces the previously derived key for this direction,
- a first message is sent or received which comprises an indication indicating that the value transmitted in the first message is to be used as a key to protect traffic to be sent to the sender of the first message, and a second message which is a return message is received or sent which comprises an indication indicating that a value transmitted in the second, return message is to be used as an input to a key derivation function to derive keys to protect traffic in both directions, wherein one of these keys replaces the key transmitted in the first message.

In accordance with one or more embodiments of the invention at least one of early media, forking, retargeting, and multicast may be supported in the secure communication.

In accordance with one or more embodiments of the invention the method may be implemented in an Internet protocol based multimedia environment using a session initiation protocol.

In accordance with one or more embodiments of the invention a key for receiving early media provided in a signaling message or derived from a value provided in a signaling message may be overwritten later by another key provided in an answering signaling message or derived from a value provided in an answering signaling message.

In accordance with one or more embodiments of the invention session description protocol security descriptions may be used without change of protocol syntax.

In accordance with one or more embodiments of the invention an apparatus for secure communication is provided, comprising: a sender configured to send a message over a secure signalling path to a recipient, the message comprising a value indicating a key for protecting information for secure communication, or a key derivation value for deriving at least one key for protecting information for secure communication, the message further comprising an indication indicating the type of usage of the value.

In accordance with another embodiment of the invention an apparatus for secure communication may be provided, comprising a receiver configured to receive a message over a secure signalling path from a sender, the message comprising a value indicating a key for protecting information for secure communication, or a key derivation value for deriving at least one key for protecting information for secure communication, the message further comprising an indication indicating the type of usage of the value.

In accordance with one or more embodiments of the invention the indication may indicate at least one of:
the value is to be used as master key for protecting media traffic to be sent by the sender of the message,
the value is to be used as master key for protecting media traffic to be received by the sender of the message,
the value is to be used as input to a key derivation function to derive a master key for protecting media traffic received to be sent by the sender of the message or to be received by the sender of the message,
the value is to be used as input to a key derivation function to derive master keys for protecting media in sending and receiving directions,
no value is provided.

A receiver of the message may be configured to return a return message comprising a value indicating a key for protecting information for secure communication, or a key derivation value for deriving at least one key for protecting information for secure communication, the return message further comprising an indication indicating the type of usage of the value comprised in the return message.

In accordance with one or more embodiments of the invention a sender of the message may be configured to receive a return message comprising a value indicating a key for protecting information for secure communication, or a key derivation value for deriving at least one key for protecting information for secure communication, the return message further comprising an indication indicating the type of usage of the value comprised in the return message.

An indication comprised in the return message may e.g. indicate at least one of:
the value is to be used as master key for sending protecting media traffic to be sent by the sender of the return message,
the value is to be used as master key for receiving protecting media traffic from to be received by the sender of the return message,
the value is to be used as input to a key derivation function to derive a master key for sending protecting media traffic to be sent by the sender of the return message or to be received by the sender of the return message,
the value is to be used as input to a key derivation function to derive master keys for protecting media in sending and receiving directions,
no value is provided.

In accordance with one or more embodiments of the invention the apparatus may be configured to send or receive a first message which comprises an indication indicating that the value is to be used as an input to a key derivation function to derive a key, and to receive or send a second message which is a return message, which return message comprises an indication indicating that the value transmitted in the return message is to be used as an additional input to the key derivation function, whereby the key derivation function is used to derive two different keys to protect traffic in both directions; or the apparatus may be configured to send or receive a first message which comprises an indication indicating that the value transmitted in this message is to be used as an input to a key derivation function to derive a key, and to receive or send a second message which is a return message is which comprises an indication indicating that the value transmitted in the second, return message is to be used on the one hand as an additional input to the key derivation function to derive a key to protect traffic received by the sender of the return message, and on the other hand as a key to protect traffic received from the sender of the return message, or the apparatus may be configured to send or receive a first message is which comprises an indication indicating that no value is transmitted in this message, and to receive or send a second, return message which comprises an indication indicating that a value transmitted in the return message is to be used as an input to a key derivation function to derive two different keys to protect traffic in both directions, or the apparatus may be configured to send or receive a first message which comprises an indication indicating that the value transmitted in this message is to be used as an input to a key derivation function to derive keys to protect traffic in both directions, and to receive or send a second, return message which comprises an indication indicating that a value transmitted in the second, return message is to be used as a key to protect traffic sent by the sender of the second, return message, wherein this key is configured to replace the previously derived key for this direction, or the apparatus may be configured to send or receive a first message which comprises an indication indicating that the value transmitted in the first message is to be used as a key to protect traffic to be sent to the sender of the first message, and to receive or send a second message which is a return message which comprises an indication indicating that a value transmitted in the second, return message is to be used as an input to a key derivation function to derive keys to protect traffic in both directions, wherein one of these keys is configured to replace the key transmitted in the first message.

In accordance with one or more embodiments of the invention the apparatus may be configured to support at least one of early media, forking, retargeting, and multicast in the secure communication, or may be configured to be used in an Internet protocol based multimedia environment using a session initiation protocol.

In accordance with one or more embodiments of the invention the apparatus may be configured to overwrite a key for receiving early media provided in a signaling message or derived from a value provided in a signaling message, by another key provided in an answering signaling message or derived from a value provided in an answering signaling message.

In accordance with one or more embodiments of the invention the apparatus may e.g. be at least one of a terminal, mobile station, user equipment, module, chipset.

In accordance with one or more embodiments of the invention a computer program product having computer-executable components configured to carry out or implement, when run on the computer, any one of the features mentioned above or below. The computer program product may e.g. be or embodied in a computer readable storage medium.

In accordance with one or more embodiments of the invention session description protocol security descriptions may be used without change of protocol syntax.

Other objects, features and advantages of the invention will become apparent from the following description of embodiments of the invention.

BRIEF DESCRIPTION OF DRAWINGS

FIG. 4 shows a table listing several modes in accordance with embodiments of the invention;

FIG. 10 shows an embodiment of an apparatus such as a terminal or a user equipment.

DESCRIPTION OF EMBODIMENTS

In accordance with one or more embodiments of the invention one or more or a plurality of modes may be provided or selected by one or more of the endpoints. In addition or alternatively, a flexible choice of modes may be possible.

In accordance with one or more embodiments of the invention, a variety of possibilities for establishing keys is provided which supports appropriate selection of good solutions to problems such as e.g. forking/retargeting, multicast, and early media key management problem. At the same time, in accordance with one or more embodiments of the invention the combinations leave enough degree of freedom to address e.g. just a subset of relevant security requirements. As an example, a mode using keys such as "bothkeys"/"sendkey" yields an advantageous solution. Likewise, other modes provide advantageous and competitive solutions.

In accordance with one or more embodiments of the invention, session description protocol security descriptions, SDES, may be enhanced without change of the protocol syntax.

In accordance with one or more embodiments of the invention, encrypted early media can be supported in a mode wherein a first exchanged key can be overwritten later by generating a more secure key. Such a method may e.g. be implemented in the context of SIP/IMS or other context.

Figure 1:
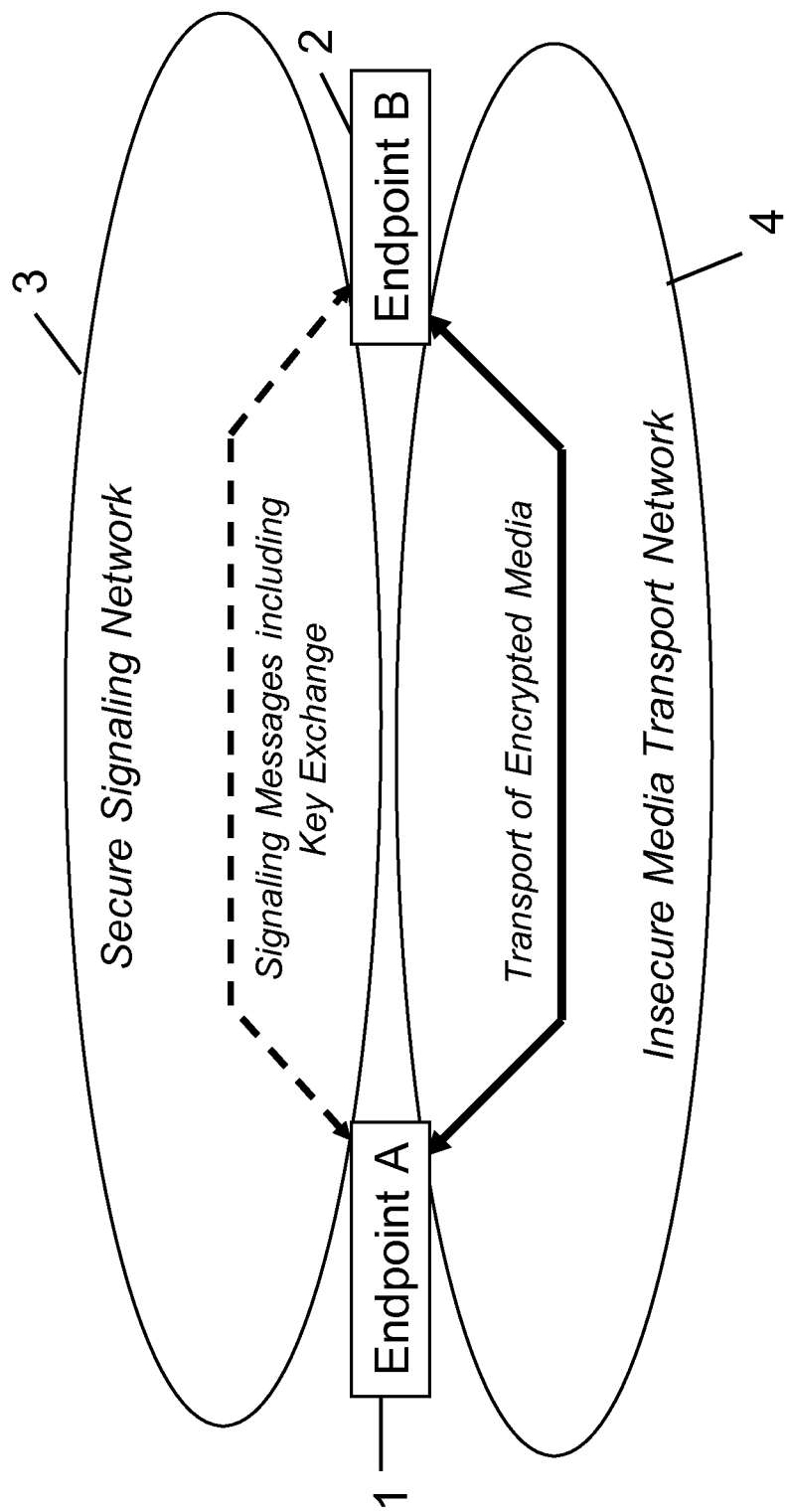
FIG. 1 illustrates embodiments of a network, method, system and apparatuses in accordance with embodiments of the invention.

FIG. 1 illustrates an example embodiment of a network configuration able to provide communication between terminals such as mobile stations, computers, clients, hosts etc indicated as endpoints 1, 2 (endpoint A, endpoint B). As shown in FIG. 1, a secure signaling network 3 configured to provide secure signalling and/or other types of secure communication such as data or voice etc, and an insecure media transport network 4 configured to provide insecure media transport, such as unprotected transport of data or voice etc are provided. In the embodiment of FIG. 1, the secure signaling network 3 is configured to carry signaling messages including key exchange between the endpoints 1, 2. Encrypted media or data is transported between the endpoints 1, 2 via the insecure transport network 4.

Figure 2:
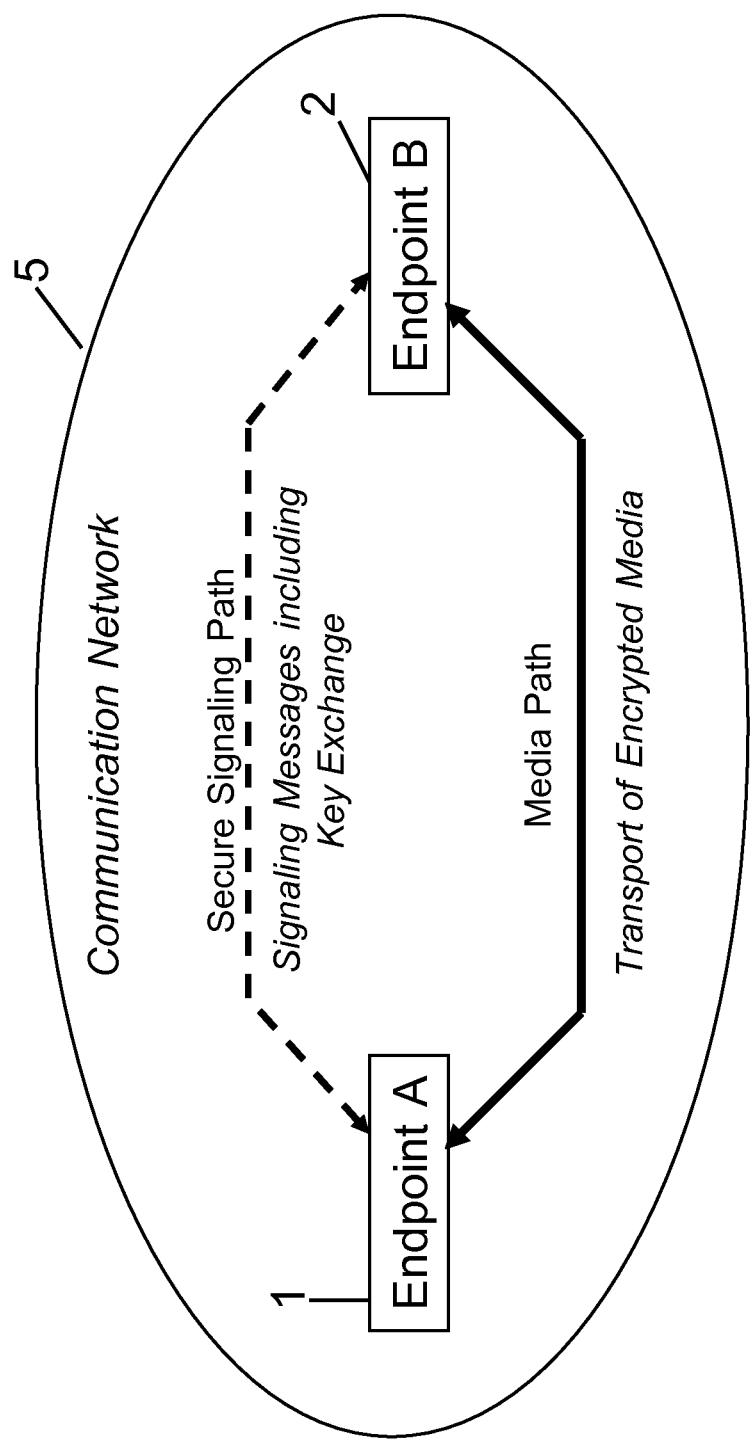
FIG. 2 shows further embodiments configured in accordance with possible implementations of the invention.

FIG. 2 shows another example embodiment of a network configuration wherein a communication network 5 is able to provide communication between the terminals such as mobile stations, computers, clients, hosts etc indicated as endpoints 1, 2 (endpoint A, endpoint B). As shown in FIG. 2, both a secure signaling path as well as a media path can be provided between the endpoints 1, 2. In the embodiment of FIG. 2, the secure signaling path is configured to carry signaling messages including key exchange, and/or other types of secure communication such as data or voice etc, between the endpoints 1, 2. Media and/or other types of insecure communication such as data or voice etc. may be transported between the endpoints 1, 2 via the media path. As the media path is not secure, specific protection is provided in accordance with one or more embodiments of the invention to make communication via the media path secure, e.g. encryption and integrity protection of the media.

Figure 3:
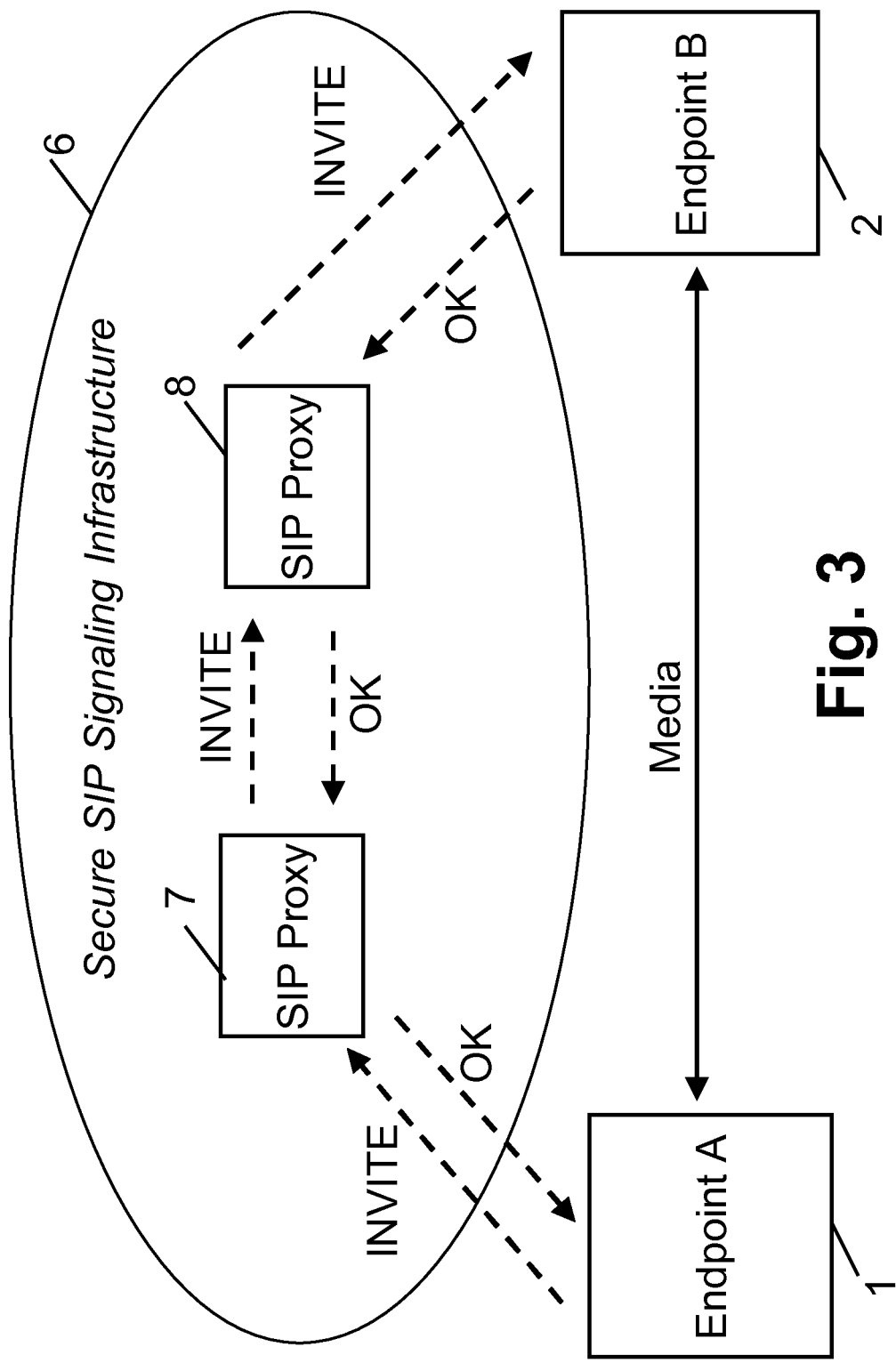
FIG. 3 illustrates another embodiment of a network being configured to implement or be used with embodiments of the invention.

FIG. 3 illustrates another example embodiment of a network configuration able to provide communication between terminals such as mobile stations, computers, clients, hosts etc indicated as endpoints 1, 2 (endpoint A, endpoint B). As shown in FIG. 3, a secure signaling infrastructure 6 is provided which is optionally based on a protocol for initiating a session such as session initiation protocol SIP. The infrastructure network or system 6 comprises at least one proxy server such as SIP proxy 7, 8 for signaling communication with the endpoints 1 and 2 such as indicated in FIG. 3, messages INVITE or OK according to SIP. The infrastructure 6 is configured to provide secure signalling and/or other types of secure communication such as data or voice transport etc. Media can be transported between the endpoints 1, 2 via other structures or paths as shown in FIG. 3, see the data flow Media between the endpoints. This communication path may be an insecure media transport path providing insecure media transport, such as unencrypted transport of media or data or other types of information such as data or voice etc.

One or more embodiments of the invention provide a key exchange in a specific environment. In accordance with one or more embodiments, an infrastructure is provided or used that allows parties to establish one or more sessions by suitable signaling. This infrastructure may e.g. be the infrastructure 6 of FIG. 3, secure signaling network 3 of FIG. 1 or secure signaling path of FIG. 2 or an apparatus or network of any suitable kind but may also be implemented in other manner. This infrastructure may optionally not be adapted to transport the information to be exchanged in the session, e.g. the audio and video streams or other content in an audio and video call or call of other type, and may carry only signaling but no user traffic in this or other embodiments.

The infrastructure, apparatus or network according to this or other embodiments provides means to transport signaling messages and possibly additional services, like services to address parties without knowing an actual address of the party on the network layer such as an Internet Protocol, IP, address. This infrastructure may provide security for signaling messages, i.e. provide means that prevent any malicious parties to eavesdrop or alter the signaling traffic.

Such an environment may allow key establishment in a very straightforward way: A party just selects a master key it wants to use for protecting the traffic it is going to send over the insecure network and uses the secure signaling infrastructure to tell the communication peers the master key. A party may also select the master key to be used by other parties in the session. E.g., in a voice call where A calls B, either A or B may choose both master keys, one for the flow from party A to B and another one for the flow from party B to A. In accordance with one or more embodiments of the invention, the signaling protocol comprises protocol elements that allow this kind of key exchange.

So, in this environment, expensive key exchange mechanisms involving asymmetrical crypto-mechanisms or DH key exchanges can be avoided.

An example embodiment of such an environment is an Internet Protocol (IP) based multimedia communication using a protocol for initiating a session such as SIP, session initiation protocol, RFC3261, as shown in FIG. 3. In such a SIP scenario, the signaling infrastructure may comprise a network of servers such as SIP servers 7, 8, interconnected by an IP network. Endpoints such as endpoints 1, 2 within the IP network that want to establish a media session, may exchange messages such as SIP messages via these servers. In particular, a calling party may use e.g. an "INVITE" message to initiate a session, and a called party may accept such an invitation with e.g. a "200 OK" message, which in turn is acknowledged by the calling party e.g. with an "ACK" message. The session establishment may involve also other messages.

In SIP, the caller may include a session description (an offer) in the INVITE message, and called parties may include a corresponding session description (an answer) in the 200 OK message (see RFC3264 and RFC4566).

The communication between endpoints such as endpoints 1, 2 and SIP servers such as proxies 7, 8, and between different SIP servers can be secured by applying network- or transport-layer security mechanisms, like IPsec/IKE (RFC4301, RFC4302, RFC4304, RFC4306) or transport layer security, TLS (RFC4346). Protection may also be provided without cryptography, by preventing any malicious party from gaining access to a network or a connection. The signaling infrastructure may also comprise a PKI, at least for the SIP servers or even for the endpoints, that allows cryptographic protection of SIP messages or essential parts of them based on public key cryptography.

A specific SIP environment is a multimedia subsystem such as an IP multimedia subsystem, IMS, specified by 3GPP. Here, a number of mechanisms are specified to secure the SIP signaling between endpoints and SIP servers, while other mechanisms are defined to protect SIP between SIP servers, including interconnection between different network operators. So in an IMS environment, signalling such as SIP signaling can be considered secure.

To provide a high degree of flexibility in call establishment, the signaling infrastructure such as networks 3, 6 may provide specific mechanisms, which, in the SIP-scenario, are known as "forking" and "retargeting". Here, the signaling information sent by a party that is going to establish a session (the "caller") may be transported to different endpoints (e.g. different endpoints assigned to the same, called party). Some of these endpoints may observe the incoming signaling message (e.g. an INVITE message in a SIP-scenario), but may not answer. Therefore, when the session is eventually established between the calling endpoint and one or more called endpoints, it is unclear for the caller and maybe also for the other endpoints in the session, whether there are additional endpoints that might know the information sent when establishing the session. When considering to perform rekeying, i.e. establish new master keys (after the session has been setup) exactly between the endpoints involved in the session, additional signaling messages are required. In particular, as parties in a session might not be aware whether forking/retargeting did happen, this would have to be done for all sessions, thus doubling the number of signaling messages needed for key exchange. In accordance with one or more embodiments of the invention these disadvantages can be avoided.

Media sessions may involve more than two parties. In this case, a party may want to send identical streams to more than one other party. In such a case multicast may be employed. An example is a media bridge that receives multiple media streams from multiple other endpoints, mixes the media and sends the mixed stream to all other endpoints. If media protection is applied in such a scenario, it is advantageous, if the multicast sender does not have to protect the common stream individually for each receiver, but can rather use one common "shared" key. This relieves the sender from the effort to perform multiple cryptographic computations, and also allows to make use of multicast features of lower layer network equipment like IP routers or L2 switches, if such features are available. Embodiments of the invention support such multicast feature.

It may be desired that a party starting a session establishment is able to receive media even before a called endpoint has answered. Such media is called "early media" and is useful e.g. in cases, where nodes of the signalling infrastructure want to send announcements to the caller before the session is established. Support of early media means that the signaling message used to start session establishment may contain all the information needed to send media to the caller. In case of cryptographic protection of the early media, both sender and receiver should be in possession of the master key used to protect the media. Embodiments of the invention support such early media feature. The ability to receive early media may also be provided in a SIP-environment.

In accordance with one or more embodiments of the invention an environment for establishing multimedia sessions is provided wherein communicating endpoints may use a secure signaling infrastructure to establish master keys for securing multimedia sessions. Complex cryptography for the key exchange such as public key cryptography and DH key exchanges can be avoided. In accordance with one or more embodiments of the invention the key exchange does not involve more than a single roundtrip (i.e. one message in one direction followed by one message in the other direction), so that increased signaling traffic can be avoided. In accordance with one or more embodiments of the invention the signaling infrastructure supports forking/retargeting. Support of efficient multicast sessions as well as early media may also be provided.

To support efficient multicast, the multicast sender may in accordance with one or more embodiments of the invention choose a master key for the traffic it sends—so it can choose the same key for all recipients of the multicast stream and may encrypt the flow it sends only once. Note that the multicast sender may either be the calling party or the called party.

In accordance with one or more embodiments of the invention the keying mechanism is able to support forking/retargeting, efficient multicast and early media.

Embodiments of the invention provide a flexible key exchange mechanism that allows the calling endpoints to transmit a value that may either be used as a key, or alternatively as a part of the input to a key derivation mechanism. The endpoint may have means to indicate how the transmitted value may be used. A called endpoint, in its response, may also transmit such a value plus an indication how it may be used.

In accordance with one or more embodiments of the invention, one or more of the following values and indications may be used. The values may be cryptographic keys such as sequences of bits or may be input values for a key derivation function or device such as bit sequences like numbers, strings, alphanumeric sequences etc. The indication may indicate that the value is a master key for protecting traffic in one or the other of the two directions, or can be an input to a key derivation function to derive master keys for protecting traffic in one or both directions. In the latter case, it can be the only input to that function, or it can be part of the input and the other part may be provided by the other party.

The following may e.g. be indicated.

An indication "sendkey" may indicate that the value sent with a message including the indication "sendkey" is to be used as a master key for protecting the media traffic that the sender of the message will send in the media session.

An indication "nonce" may indicate that the value sent with the message including this indication "nonce" is to be used as an input for a key derivation function to derive a master key for protecting the media traffic that the sender of the message will send in the media session.

In accordance with one or more embodiments of the invention, if "nonce" is used by calling and called party, the two transmitted values are used as input to a key derivation mechanism that generates two master keys. The key derivation mechanism may be provided in one or more or all endpoints or in an intermediate element or apparatus. The key derivation function may e.g. be a pseudo random function, taking both values as an input and producing enough output for two master keys. Alternatively, a hash function H may be used, to produce two keys e.g. H(value1,value2) and H(value2,value1), or H(0,value1,value2) and H(1,value1,value2) ("," stands for concatenation of the bit strings).

In an embodiment if one party uses "sendkey" and the other "nonce", the value provided as "sendkey" is used as a master key for protecting the media traffic that the sender of the message containing the "sendkey" will send in the media session. For the traffic in the opposite direction, a master key may be computed by using the value transmitted as "nonce" and the value transmitted as "sendkey" as input to the key derivation function.

If both parties use "sendkey", each one transmits its master key for protecting the traffic it sends.

In accordance with one or more embodiments, a caller may use "nonce" so the key exchange is secure with respect to forking/retargeting. If e.g. no multicast is involved, the called endpoint(s) may also use "nonce". This results in individual master keys to be used for the different flows of the session. If the called party is a multicast sender (e.g. a media bridge, where the calling party "dials in"), it may use "sendkey" (and e.g. select a key that it can share among all recipients of the multicast stream). So multicast can be supported efficiently.

In case the calling party is a multicast sender, the mechanism is configured according to one or more embodiments to offer a choice of either preferring security with respect to forking/retargeting and forego efficient multicast, or preferring efficient multicast and forego security with respect to forking/retargeting. Both ways can be reasonable, depending on the confidentiality of the communication, the number of involved endpoints, the processing capabilities of the multicast sender etc.

Note that the labels "sendkey" or "nonce" are only examples—any coding and naming is possible for this indication. This holds also for the other labels discussed in the following.

In the following some further embodiments and ways of using the transmitted values are described.

One or more of the following indication options may additionally or alternatively be used:

An indication "bothkeys" may indicate that the value is to be used to derive master keys for both directions, by using it as an input to a key derivation function, as described above.

An indication "nothing" may indicate that no value is provided. In that case, the other endpoint may or should indicate "bothkeys" in a response.

These options may be used pair wise, one by the caller, the other by the called endpoints.

In an embodiment an additional option is provided in which, if the calling endpoint (caller) used "bothkeys", a called endpoint may answer with "sendkey". This has following semantics and advantages: As long as the caller does not receive an answer of the called endpoint, it expects received media traffic (early media) to be protected by a receiving key (K1) that the called and calling endpoints derived from the information provided by the caller and sent to the called endpoint. The caller decrypts information received from the called endpoint using the receiving key K1. After the caller received the answer from the called endpoint with "sendkey", it replaces K1 with the key sent by the called endpoint.

This allows encrypted early media. After the call establishment however, the key used for early media is replaced by another key that is more secure and is not affected by the forking/retargeting issue. This approach is well suited for cases where the caller wants to receive encrypted early media and wants the media received after session establishment to be protected with respect to the forking/retargeting issue.

Moreover, it allows both endpoints to do efficient multicast. In accordance with one or more embodiments of the invention transmitted values may also have other or additional significance.

The following indication option may also be used:
An indication "reckey" may indicate that the value is to be used by the receiving device as a master key for protecting the media traffic that the sender of the message with "reckey" will receive (receiving key).

This value may be used by the caller. Called endpoints in this case may also use "reckey". This option may be useful in an environment, where efficient multicast is no issue, but where early media (as explained above) should be provided. Concerning forking/retargeting, the approach provides security at least for the flows from the caller towards called endpoints. This is e.g. useful in cases, where a caller intends to transmit sensitive media, but the called parties do not.

In case the caller uses "reckey", a called endpoint may also be allowed to answer with "bothkeys". This has semantics similar to the case above, where "bothkeys" is answered by "sendkey":
As long as the caller does not receive an answer of the called endpoint, it expects received media traffic (early media) to be protected by the receiving key (K1) that the caller has provided when initiating the session establishment. After the caller received the answer with "bothkeys", it replaces K1 with the proper key that has to be derived from the information provided by the called endpoint.

This allows encrypted early media. After the call establishment however, the key used for early media is replaced by another key that is more secure (because it is not affected by the forking/retargeting issue).

This approach is well suited for cases where the called endpoint wants to receive encrypted early media, and wants the media received after session establishment to be protected with respect to the forking/retargeting issue. Also the sent media from the caller to the called endpoint are secure with respect to the forking/retargeting issue. Moreover, the approach allows the called endpoint to do efficient multicast.

The table 9 shown in FIG. 4 gives an overview over some of the modes that are possible using the specified options.

In mode 1, the caller or caller endpoint uses the indication "sendkey" in the message sent to the called endpoint. The called endpoint sends "sendkey" in the response message sent to the caller. In case of forking/retargeting, non responding parties do get the callers sending key. In case of forking/retargeting, non responding parties do not get the called parties sending keys. The use of a plurality term, such as parties, is intended to cover also the singular case, e.g. party, also in the above and following. Multicast is supported for the caller. Multicast is supported for the called party. Early media is not supported.

In mode 2, the caller or caller endpoint uses the indication "nonce" in the message sent to the called endpoint. The called endpoint sends "nonce" in the response message sent to the caller. In case of forking/retargeting, non responding parties do not get the callers sending key. In case of forking/retargeting, non responding parties do not get the called parties sending keys. Multicast is not supported for the caller. Multicast is not supported for the called party. Early media is not supported.

In mode 3, the caller or caller endpoint uses the indication "nonce" in the message sent to the called endpoint. The called endpoint sends "sendkey" in the response message sent to the caller. In case of forking/retargeting, non responding parties do not get the callers sending key. In case of forking/retargeting, non responding parties do not get the called parties sending keys. Multicast is not supported for the caller. Multicast is supported for the called party. Early media is not supported.

In mode 4, the caller or caller endpoint sends the indication "bothkeys" in the message sent to the called endpoint. The called endpoint sends the indication nothing in the response message sent to the caller. In case of forking/retargeting, non responding parties do get the callers sending key. In case of forking/retargeting, non responding parties do get the called parties sending keys. Multicast is supported for the caller. Multicast is not supported for the called party. Early media is supported.

In mode 5, the caller or caller endpoint uses the indication nothing in the message sent to the called endpoint. The called endpoint sends "bothkeys" in the response message sent to the caller. In case of forking/retargeting, non responding parties do not get the callers sending key. In case of forking/retargeting, non responding parties do not get the called parties sending keys. Multicast is not supported for the caller. Multicast is supported for the called party. Early media is not supported.

In mode 6, the caller or caller endpoint uses the indication "bothkeys" in the message sent to the called endpoint. The called endpoint sends "sendkey" in the response message sent to the caller. Media sent to the caller is protected with a key derived from the value in the callers message until the called endpoint sends the response message. (This media is "early media".) After the response message, the key contained in the response message is used for media from the called endpoint to the caller. In the above and following the term caller intends to cover both the caller or caller endpoint. In case of forking/retargeting, non responding parties do get the callers sending key. In case of forking/retargeting, non responding parties do get the key for protecting early media, but do not get the called parties sending keys for protecting media after the called parties' responses. Multicast is supported for the caller. Multicast is supported for the called party.

In mode 7, the caller or caller endpoint uses the indication "reckey" in the message sent to the called endpoint. The called endpoint sends "reckey" in the response message sent to the caller. In case of forking/retargeting, non responding parties do not get the callers sending key. In case of forking/retargeting, non responding parties do get the called parties sending keys. Multicast is not supported for the caller. Multicast is not supported for the called party. Early media is supported.

In mode 8, the caller or caller endpoint uses the indication "reckey" in the message sent to the called endpoint. The called endpoint sends "bothkeys" in the response message sent to the caller. Media sent to the caller is protected with the key from the callers message until the called endpoint sends the response message. (This media is "early media".) After the response message, a key derived from the value contained in the response message is used for media from the called endpoint to the caller. In case of forking/retargeting, non responding parties do not get the callers sending key. In case of forking/retargeting, non responding parties do get the key for protecting early media, but do not get the called parties sending keys for protecting media after the called parties's responses. Multicast is not supported for the caller. Multicast is supported for the called party. Early media is supported.

Figure 5:
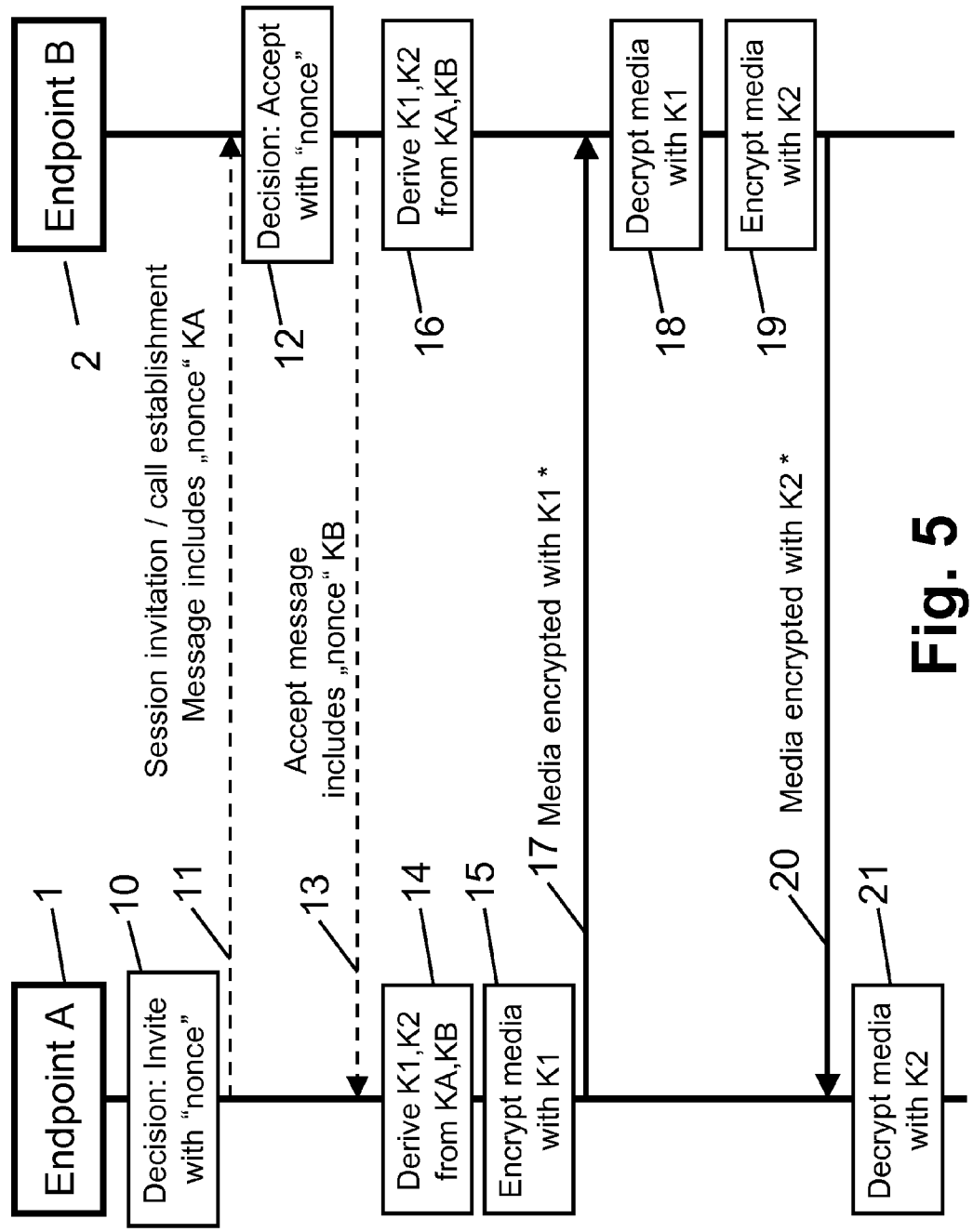
FIG. 5 illustrates embodiments of a flow chart, methods and message exchanges in accordance with one or more embodiments.

FIG. 5 shows an embodiment for implementing mode 2 illustrated in FIG. 4.

In a block or step 10, the endpoint 1 decides or is instructed to use "nonce" as indication for establishing a secure communication. The endpoint 1 decides to send a message such as a SIP message like INVITE indicating a value and the indication "nonce".

The endpoint 1 then sends in step 11 a session invitation or call establishment message to the other endpoint 2 which message includes the indication "nonce" and a key derivation value KA.

The endpoint 2 decides in step or block 12 to also use and send an indication "nonce", and sends a message 13 to the endpoint 1 which may be an accept message comprising the indication "nonce" and a key derivation value KB.

In block 14, the endpoint 1 derives keys K1, K2 from KA, KB. The endpoint 1 encrypts media to be sent to endpoint 2 with the key K1, as shown in block 15, and sends the media encrypted with K1 to endpoint 2 as shown by message 17.

In block 16, the endpoint 2 derives keys K1, K2 from KA, KB.

As shown in block 18, the endpoint 2 decrypts received media with key K1. Media to be sent to endpoint 1 are encrypted using key K2, see block 19. Media encrypted with K2 are sent to the endpoint 1 in message 20. The endpoint 1 decrypts media received from endpoint 2 using key K2, see block 21.

An asterisk * added to messages 17, 20 indicates that these media streams 17 and 20 can flow simultaneously.

Figure 6:
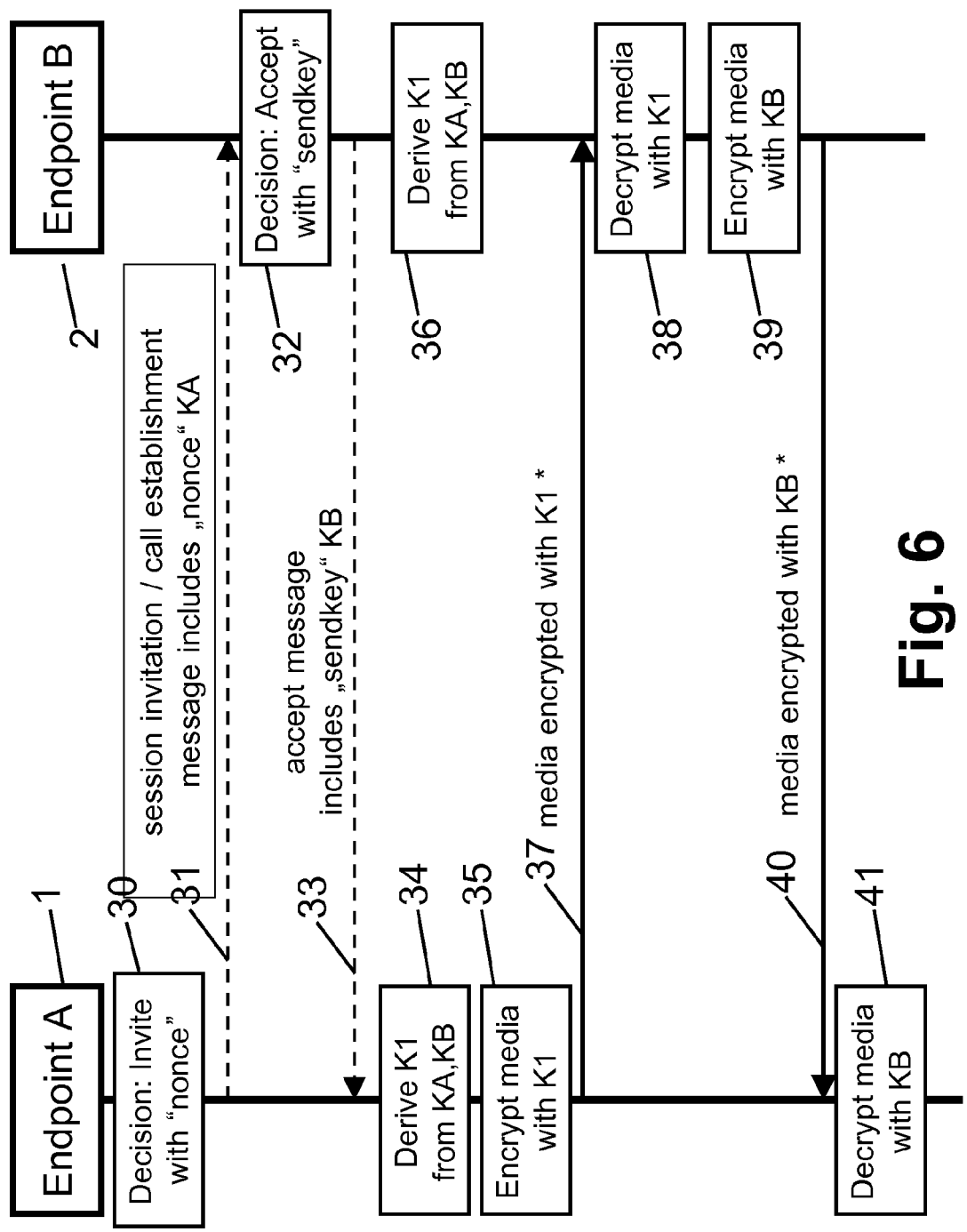
FIG. 6 illustrates embodiments of a flow chart, methods and message exchanges in accordance with another implementation.

FIG. 6 shows an embodiment for implementing mode 3 illustrated in FIG. 4.

In a block or step 30, the endpoint 1 decides or is instructed to use "nonce" as indication for establishing a secure communication. The endpoint 1 decides to send a message such as a SIP message like INVITE indicating a value KA and the indication "nonce".

The endpoint 1 then sends in step 31 a session invitation or call establishment message to the other endpoint 2 which message includes the indication "nonce" and the key derivation value KA.

The endpoint 2 decides in step or block 32 to send an indication "sendkey" and value KB, and sends a message 33 to the endpoint 1 which may be an accept message comprising the indication ""sendkey"" and the key and also key derivation value KB.

In block 34, the endpoint 1 derives key K1 from KA, KB. The endpoint 1 encrypts media to be sent to endpoint 2 with the key K1, as shown in block 35, and sends the media encrypted with K1 to endpoint 2 as shown by message 37.

In block 36, the endpoint 2 derives key K1 from KA, KB.

As shown in block 38, the endpoint 2 decrypts received media with key K1. Media to be sent to endpoint 1 are encrypted using key KB, see block 39. Media encrypted with KB are sent to the endpoint 1 in message 40. The endpoint 1 decrypts media received from endpoint 2 using key KB, see block 41.

An asterisk * added to messages 37, 40 indicates that these media streams 37 and 40 can flow simultaneously.

Figure 7:
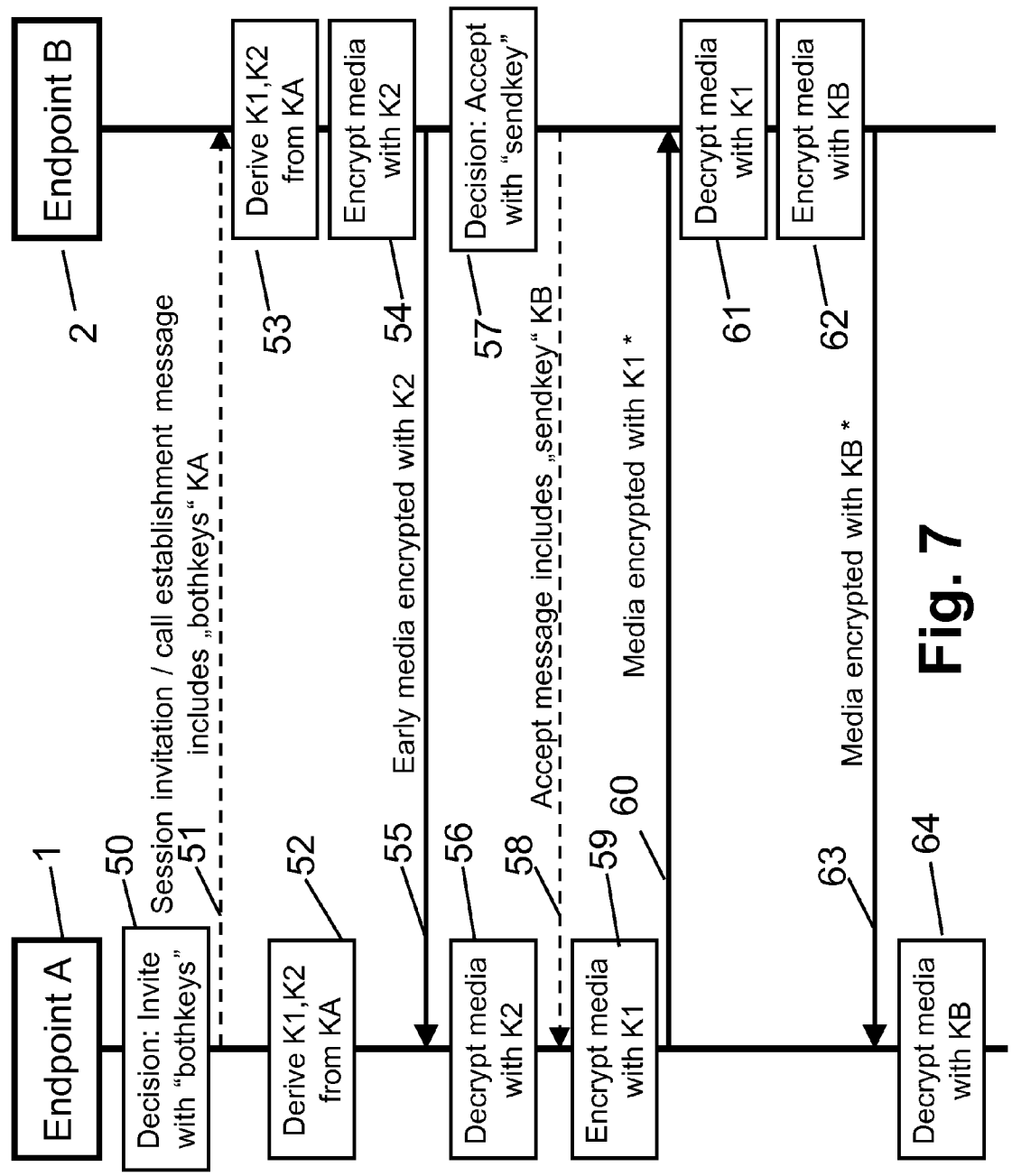
FIG. 7 illustrates embodiments of a flow chart, methods and message exchanges in accordance with one or more other implementations.

FIG. 7 shows an embodiment for implementing mode 6 illustrated in FIG. 4.

In a block or step 50, the endpoint 1 decides or is instructed to use "bothkeys" as indication for establishing a secure communication. The endpoint 1 decides to send a message such as a SIP message like INVITE indicating a value KA and the indication "bothkeys". The endpoint 1 then sends in step 51 a session invitation or call establishment message to the other endpoint 2 which message includes the indication "bothkeys" and the key derivation value KA.

In block 52, the endpoint 1 derives keys K1, K2 from KA.

The endpoint 2 derives keys K1, K2 from KA in block 53.

The endpoint 2 encrypts early media to be sent to endpoint 1 with the key K2, as shown in block 54, and sends the early media encrypted with K2 to endpoint 1 as shown by message 55.

As shown in block 56, the endpoint 1 decrypts received early media with key K2.

The endpoint 2 decides in step or block 57 to send an indication "sendkey" and value KB, and sends a message 58 to the endpoint 1 which may be an accept message comprising the indication "sendkey" and the key KB.

The endpoint 1 will encrypt media to be sent to endpoint 2 using key K1, see block 59. Media encrypted with K1 are sent to the endpoint 2 in message 60. The endpoint 2 decrypts media received from endpoint 1 using key K1, see block 61.

The endpoint 2 encrypts media to be sent to endpoint 1 after the message 58 using key KB, see block 62. Media encrypted with KB are sent to the endpoint 1 in message 63. The endpoint 1 decrypts media received from endpoint 2 after the message 58 using key KB, see block 64.

An asterisk * added to messages 60, 63 indicates that these media streams 60 and 63 can flow simultaneously.

Figure 8:
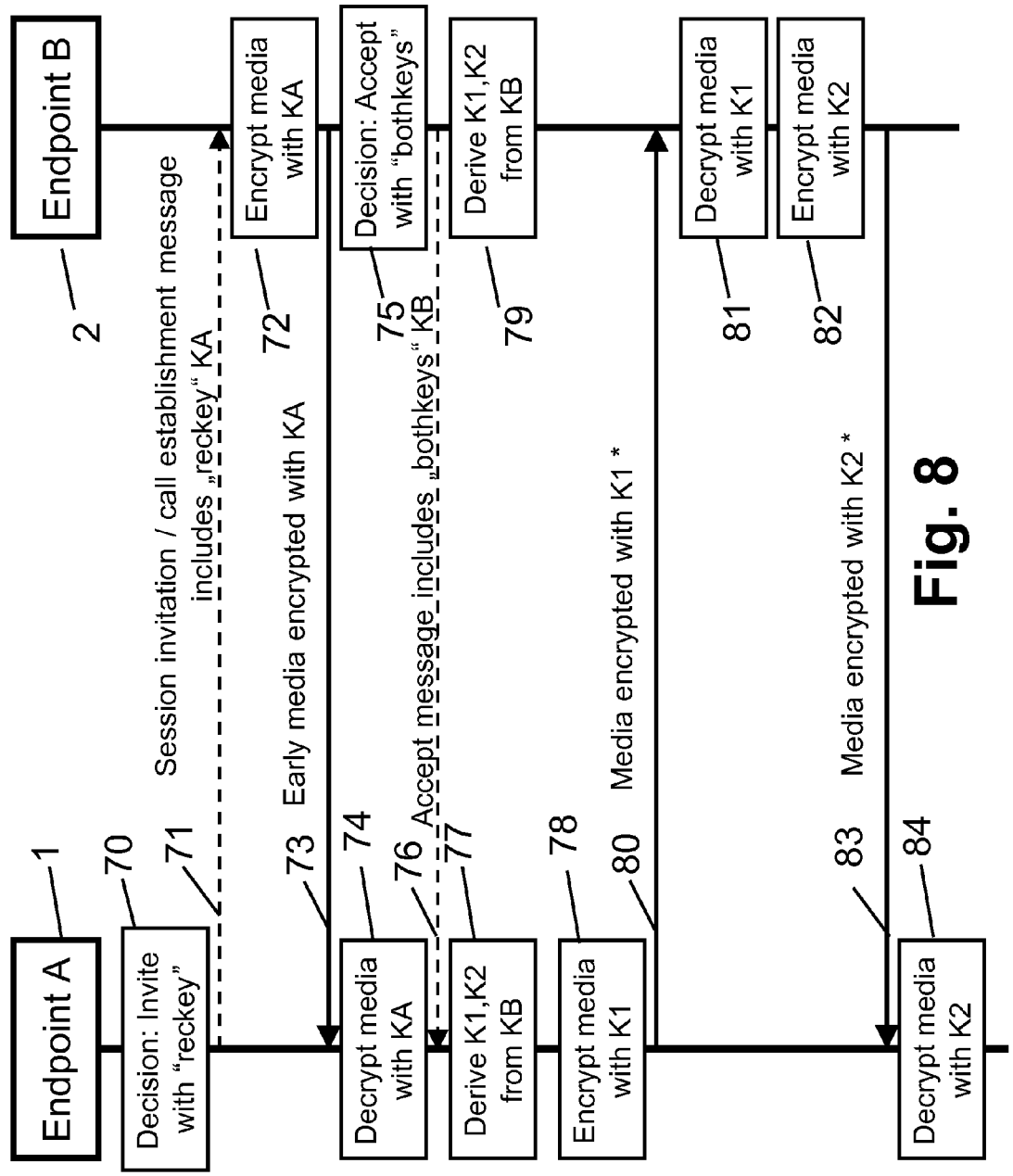
FIG. 8 illustrates other embodiments of a flow chart, methods and message exchanges in accordance with one or more embodiments.

FIG. 8 shows an embodiment for implementing mode 8 illustrated in FIG. 4.

In a block or step 70, the endpoint 1 decides or is instructed to use "reckey" as indication for establishing a secure communication. The endpoint 1 decides to send a message such as a SIP message like INVITE indicating a value KA and the indication "reckey". The endpoint 1 then sends in step 71 a session invitation or call establishment message to the other endpoint 2 which message includes the indication "reckey" and the key derivation value KA.

The endpoint 2 encrypts early media to be sent to endpoint 1 with the key KA, as shown in block 72, and sends the early media encrypted with KA to endpoint 1 as shown by message 73.

As shown in block 74, the endpoint 1 decrypts received early media with key KA.

The endpoint 2 decides in step or block 75 to send an indication "bothkeys" and value KB, and sends a message 76 to the endpoint 1 which may be an accept message comprising the indication "bothkeys" and the key derivation value KB.

In block 77, the endpoint 1 derives keys K1, K2 from KB.

The endpoint 1 thereafter will encrypt media to be sent to endpoint 2 using key K1 instead of KA, see block 78. Media encrypted with K1 are sent to the endpoint 2 in message 80. The endpoint 2 decrypts media received from endpoint 1 using key K1, see block 81.

The endpoint 2 encrypts media to be sent to endpoint 1 using key K2, see block 82. Media encrypted with K2 are sent to the endpoint 1 in message 83. The endpoint 1 decrypts media received from endpoint 2 using key K2, see block 84.

An asterisk * added to messages 80, 83 indicates that these media streams 80 and 83 can flow simultaneously.

Embodiments provide a flexible choice of modes as mentioned above or shown in FIG. 4 as examples. Many of these modes provide in itself an improvement compared to existing modes even in case the caller or called endpoint should not have or not be willing to use a possibility of selecting the indication or label which may in some embodiments be fixedly set in the respective endpoint. As example, mode 2 ("nonce"-"nonce") is better than SDES e.g. in a scenario where efficient multicast isn't an issue, and is better than DH based mechanisms in the assumed environment (secure signaling infrastructure), as it does not need expensive computations. Mode 3 ("nonce"-"sendkey") and mode 5 (nothing-"bothkeys") are better than SDES with respect to forking/retargeting, and are better than MIKEY-RSA-R in the assumed environment (secure signaling infrastructure), as they do not need expensive computations. Mode 7 ("reckey"-"reckey") is better than SDES with respect to the support of early media, and better than SDES-EM with respect to forking/retargeting. Further strongly effective modes are mode 6 ("bothkeys"-"sendkey") and mode 8 ("reckey"-"bothkeys") as each of them provides among others support for early media, protection of the media sent to the caller after session establishment with respect to forking/retargeting, and support for efficient multicast by the called party. In addition, mode 6 provides also support for efficient multicast by the calling party, and mode 8 provides also protection of the media sent by the caller with respect to forking/retargeting.

In accordance with one or more embodiments of the invention a general flexibility is provided that allows a caller to decide whether to provide no key, a sending key, a receiving key, or an input to a key derivation function to derive a sending key, or an input to a key derivation function to derive both sending and receiving key ("sending" and "receiving" from the view of the caller). Further, a flexibility is given that allows a called endpoint to decide whether to accept a sending key ("sending" from the view of the called endpoint) proposed by the caller, or to override it with a self selected key. Embodiments provide the flexibility that allows a called endpoint in case the caller sent an input to a key deriving function either to answer it with a sole additional input to the key deriving function or with a value that serves as a key as well as an additional input to the key derivation function. Embodiments support a principle to use a transmitted value as a key for one direction and as input to a key derivation function to derive a key for the other direction (e.g. mode 3). A mechanism is provided in accordance with one or more embodiments of the invention where the called party provides both keys, without the overhead of using specific cryptographical protection (e.g. mode 4). Mechanisms in accordance with one or more embodiments of the invention provide a (less secure) key usable for early media and replace this key in a later stadium of session establishment by a more secure key (e.g. modes 6 and 8). In this way these mechanisms can support early media while still preserving other important features with respect to forking/retargeting and efficient multicast. In accordance with one or more embodiments of the invention a principle to let each party provide a receiving key instead of a sending key is enabled (e.g. mode 7)

A possible implementation is to enhance SDES as it is used in the SIP-scenario.

SDES introduces a crypto object a=crypto:<tag><crypto-suite><key-params>[<session-params>]
with key-params=<key-method>":"<key-info>
and only a single key-method (value "inline"), where a key is contained directly in the crypto object.

If A sends an INVITE to B, the crypto object in the INVITE contains the key for the traffic to be sent from A to B. A can include several crypto objects. B must select one of them (identified by <tag>), but must insert a different key. This key is used for traffic sent from B to A. "inline" has the same semantic as "sendkey" as defined above.

Embodiments of the invention may be implemented by adding some or all the other indications ("nonce", "reckey", "bothkeys", "nothing") as described above as additional values for <key-method>, with the semantic as described above. (<key-info> is used to transmit the value that is either a key or an input to a key derivation function. In case of "nothing", an empty string may be used as <key-info>.) In addition, a key derivation function may be defined, using one of the variants described above.

There is also the possibility to specify only a subset of the indications and/or a subset of the modes introduced in the table shown in FIG. 4.

Applying embodiments of the invention to e.g. SDES may be done by replacing this mode by any single one of the other modes.

In accordance with one or more embodiments of the invention if only one mode is implemented in the endpoint(s) mode 8 may be implemented as an example. The caller transmits a master key that can be used to protect media to be sent to it. The called endpoint then provides input to a key generation function, and both master keys used for the media after session establishment can be derived from this. This mode supports early media, has no forking/retargeting problems for the media exchanged after session establishment, and supports efficient multicast by the called party.

E.g. if an endpoint A calls a media conference bridge using this mode, it can immediately receive encrypted early media, so e.g. tariff information or information about the state of the media conference may be announced before A is included into the conference. Eventually, A is included into the conference, and keys for both streams are provided by the media bridge to A. The media bridge chooses an individual master key to protect traffic to be sent by A, different from the master keys used for the traffic of all other endpoints, and chooses the master key for protecting the traffic it sends itself as a shared key it uses towards all involved endpoints. So the bridge can do efficient multicast, but no other endpoint (except the bridge itself) would be able to decrypt, alter or fake traffic sent by A to the bridge.

Replacing the current semantics of the <key-info> in SDES may in an embodiment even be done without change of the protocol syntax of SDES, only by using the transmitted <key-info> not necessarily as the sending key, but in the way as defined by the chosen mode.

When using the unchanged syntax of SDES with new semantics, this might be indicated in accordance with one or more embodiments of the invention by a new field in the SIP header or within the session description. This field may be used by the caller to indicate, which of the modes the caller wants to use. If a called endpoint supports this mode, it returns the same value in accordance with one or more embodiments of the invention, and the semantics of the specified mode are used. If the called endpoint does not support the mode, it does not return the value. In that case, a fallback to regular SDES may be carried out.

If the called endpoint does not recognize the new field, it may ignore it and may not return it. Again, this results in the usage of regular SDES. In accordance with one or more embodiments, a called endpoint may not be allowed to use the new field if the calling endpoint did not use it, and may not be allowed to select a different mode in such a case. In this way, interoperation between endpoints that can use the new semantics and endpoints that do no know the new semantics is possible.

Figure 9:
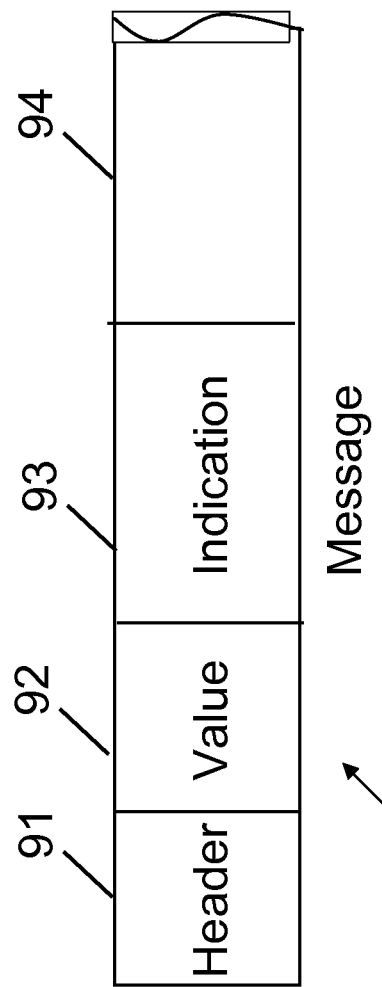
FIG. 9 shows a message structure in accordance with one or more embodiments of the invention.

FIG. 9 illustrates an embodiment of a message 90 which may be sent from or to an endpoint or terminal, e.g. endpoint 1 or 2. The message 90 may e.g. correspond to or be any one of the messages 11, 13, 31, 33, 51, 58, 71, 76. The message 90 comprises a header 91, a field 92 for transmitting the value such as the key or key derivation value, a field 93 for transmitting the indication defining the type of the value of field 92 such as "sendkey", "reckey", etc, and further message part 94 such as tail bits or other information.

FIG. 10 shows an embodiment of an apparatus 100 such as endpoint 1 or 2 of FIGS. 1 to 3 and 5 to 9, a user equipment, or part thereof, a module, chipset, etc, in accordance with an implementation of the invention. The apparatus 100 may comprise a transceiver 101 for transmitting and receiving signals to and from other apparatus e.g. the endpoint 1 or 2. The apparatus 100 comprises an information decrypter part 102 for decrypting received messages and an information encrypter part 103 for encrypting messages to be sent to other apparatus.

The apparatus 100 further comprises a security mode decider 104 for deciding on the security mode as defined, or to be defined, by the indications "sendkey", "bothkeys", etc. The apparatus 100 may further comprise a processor 105, a value generator or processor 106 for generating a value or for processing a received value, an indication generator or processor 107 for generating an indication or for processing a received indication, and a storage 108 for storing any one of values, indications, content, media, control programs or other information.

In accordance with one or more embodiments endpoints that terminate the media plane in media communication may be implemented accordingly. This may be in particular multimedia gateways or any kind of media servers, e.g. a PoC server, an audio/video server, a conference bridge etc. Further apparatuses may e.g. be mobile phones or other endpoints supporting multimedia communication over IP and SIP.

Embodiments or at least parts thereof may be implemented in accordance with e.g. 3GPP as an IMS media plane key exchange mechanism. Embodiments provide IMS media plane security and 3GPP media security.

Embodiments are able to improve the key exchange capabilities of the equipment.

The apparatus 1, 2 may e.g. be at least one of a terminal, mobile station, user equipment, module, chipset. The terminal or mobile station may e.g. be a user equipment, a client, a mobile or stationary terminal, etc.

In accordance with one or more embodiments of the invention, the session may be at least one of a data session, a voice call session, a video call, a multimedia session, a session according to a protocol for initiating a session, and a session initiation protocol session.

In accordance with one or more embodiments, a computer program product or computer readable storage medium having computer-executable components is provided configured to carry out or implement, when run on the computer, one, several, or all of the features described above or shown in the drawings.

In accordance with one or more embodiments, a computer program product is provided comprising code means configured to carry out or implement, when run on a processor, at least one, several, or all of the features described above or shown in the drawings.

The computer program product may e.g. be embodied on a computer-readable medium.

A network may comprise such an apparatus as mentioned above or shown in the drawings.

The apparatus may be adapted for, or the network may have, any type of system or architecture comprising e.g. an evolved packet service, EPS, architecture, a long term evolution, LTE, architecture, a general packet radio service, GPRS, a global system for mobile communications, GSM, or any other type of fixed or mobile communication or fixed or mobile network. The apparatus or network may comprise at least one of a serving general packet radio service support node, SGSN, a mobility management entity, MME, or a gateway. The apparatus may also be implemented in, or as part of, a media handling component such as a media gateway, media proxy, application server, gateway support node, etc.

For the purpose of the present invention as described herein above, it should be noted that any access or network technology may be used which may be any technology by means of which a user equipment can access a network or send or receive information. The network may be any device, unit or means by which a mobile or stationary entity or other user equipment may connect to and/or utilize services offered by the network. Such services may include, among others, data and/or (audio-) visual communication, data download etc.

Generally, the present invention is applicable in all those network/terminal environments relying on a data packet based transmission scheme according to which data are transmitted in data packets and which are for example based on the Internet Protocol IP. The present invention is, however, not limited thereto, and any other present or future IP or mobile IP version, or, more generally, a protocol following similar principles is also applicable. The user equipment entity may be any device, unit or means by which a system user may experience services from a network.

The sequence of method steps described above or shown in the drawings may be implemented in other sequences arbitrarily deviating from the above described or shown sequence of steps. Further, the method, apparatuses and devices, may include only one, more or all of the features described above or shown in the drawings, in any arbitrary combination.

The method steps may be implemented as software code portions and be run using a processor at a network element or terminal, can be software code independent, or can be specified using any known or future developed programming language as long as the functionality defined by the method steps is preserved. Generally, any method step is suitable to be implemented as software or by hardware without changing the idea of the present invention in terms of the functionality implemented. Devices, apparatus, units, or means, and/or method steps may be implemented as hardware components of a stationary or mobile station, or a terminal, or a network element, or part, or chipset, or module thereof. The apparatus may be a part, or chipset, or module of an entity such as a terminal, user equipment, network entity etc. The apparatus or software may be hardware independent; and may be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. Devices, apparatus, units or means (e.g. User equipment, CSCF) can be implemented as individual devices, units, means, chipsets, modules, or part of devices, and may also be implemented in a distributed fashion throughout a system, as long as the functionality of the device, unit or means is preserved.

LIST OF ABBREVIATIONS

3GPP 3.Generation Partnership Project (http://www.3gpp.org/)
DH Diffie-Hellman
IETF Internet Engineering Taskforce (http://www.ietf.org/)
IKE Internet Key Exchange protocol (RFC4306)
IMS IP Multimedia Subsystem
IP Internet Protocol
IPsec IP security (framework) (RFC4301, RFC4302, RFC4304)
L2 Layer 2 (the protocol layer below the IP layer)
MIKEY-RSA-R (name of a keying algorithm described in RFC4738)
PKI public key infrastructure
PRF pseudo random function
RFC Request For Comments (an IETF standards document)
SDP Session Description Protocol (RFC4566)
SDES SDP Security Descriptions (RFC4568)
SDES-EM (name of a keying algorithm described in /ID-SDES-EM/)
SIP Session Initiation Protocol (RFC3261)
SRTP Secure Real-time Transport Protocol (RFC3711)
TLS Transport Layer Security (RFC4346)
WWW World Wide Web

The invention claimed is:

1. A method for secure communication which comprises: sending an invite message over a secure signalling path to a recipient, the invite message including a key derivation value to be used as input to a key derivation function for deriving at least one key for protecting information for secure communication, or including no key derivation value, the invite message further comprising an indication indicating how the value or the absence of the value is to be used for deriving a master key upon which at least one key for encryption of media traffic encryption is based wherein at least one of a sender endpoint and the recipient select at least one of the indication and a replacement indication to replace the indication from a plurality of modes for deriving one or more keys according to the indication.

2. The method in accordance with claim 1, wherein the indication indicates at least one of:
the value is to be used as key for protecting media traffic to be sent by the sender of the invite message,
the value is to be used as key for protecting media traffic to be received by the sender of the invite message,
the value is to be used as input to a key derivation function to derive a key for protecting media traffic to be sent by the sender of the invite message or to be received by the sender of the invite message,
the value is to be used as input to a key derivation function to derive keys for protecting media in sending and receiving directions,
no value is provided.

3. The method in accordance with claim 2, wherein a sender of the invite message receives a return message comprising:
a return message value indicating a return message key for protecting information for secure communication, or a return message key derivation value for deriving at least one key for protecting information for secure communication, and
a return message indication indicating the type of usage of the return message value comprised in the return message.

4. The method in accordance with claim 2, wherein a sender of the invite message receives a return message comprising:
a return message value indicating a key for protecting information for secure communication, or a return message key derivation value for deriving at least one key for protecting information for secure communication, and
a return message value indication indicating the type of usage of the return message value comprised in the return message.

5. The method in accordance with claim 4, wherein the return message indication comprised in the return message indicates at least one of:
the return message value is to be used as master key for protecting media traffic to be sent by the sender of the return message,
the return message value is to be used as master key for protecting media traffic to be received by the sender of the return message,
the return message value is to be used as input to a key derivation function to derive a master key for protecting media traffic to be sent by the sender of the return message or to be received by the sender of the return message,
the return message value is to be used as input to a key derivation function to derive master keys for protecting media in sending and receiving directions,
no value is provided.

6. The method in accordance with claim 1, wherein
a first message which is an invite message is sent which comprises an indication indicating that the value is to be used as an input to a key derivation function to derive a key, and a second message which is a return message, is received, the return message comprising a return message indication indicating that a return message value transmitted in the return message is to be used as an additional input to the key derivation function, whereby the key derivation function is used to derive two different keys to protect traffic in both directions; or
a first message which is an invite message is sent which comprises an indication indicating that the value transmitted in this message is to be used as an input to a key derivation function to derive a key, and a second message which is a return message is received which comprises the return message indication indicating that the return message value transmitted in the second, return message is to be used on the one hand as an additional input to the key derivation function to derive a key to protect traffic sent to the sender of the second, return message, and on the other hand as a key to protect traffic sent by the sender of the return message; or a first message which is an invite message is sent which comprises an indication indicating that no value is transmitted in this message, and a second, return message is received which comprises the return message indication indicating that the return message value transmitted in the return message is to be used as an input to a key derivation function to derive two different keys to protect traffic in both directions; or a first message which is an invite message is sent which comprises an indication indicating that the value transmitted in this message is to be used as an input to a key derivation function to derive keys to protect traffic in both directions, and a second, return message is received which comprises the return message indication indicating that the return message value transmitted in the second, return message is to be used as a key to protect traffic sent by the sender of the second, return message, wherein this key replaces the previously derived key for this direction; or a first message which is an invite message is sent which comprises an indication indicating that the value transmitted in the first message is to be used as a key to protect traffic to be sent to the sender of the first message, and a second message which is a return message is received which comprises the return message indication indicating that the return message value transmitted in the second, return message is to be used as an input to a key derivation function to derive keys to protect traffic in both directions, wherein one of these keys replaces the key transmitted in the first message.

7. The method in accordance with claim 1, wherein at least one of early media, forking, retargeting, and multicast is supported in the secure communication.

8. The method in accordance with claim 1, wherein the method is implemented in an Internet protocol based multimedia environment using a session initiation protocol.

9. The method in accordance with claim 1, wherein a key for receiving early media provided in a signaling message or derived from a value provided in a signaling message is overwritten later by another key provided in an answering signaling message or derived from a value provided in an answering signaling message.

10. The method in accordance with claim 1, wherein session description protocol security descriptions are used without change of protocol syntax.

11. The method in accordance with claim 1, wherein:
the indication indicates that either the value or lack of value is to be used in protecting media traffic in sending or receiving or both directions as key or as input to a key derivation function to derive a key;
the sender of the invite message receives a return message comprising:
a return value or lack of return value indicating a return key for protecting media traffic or a return key derivation value for deriving at least one key for protecting media traffic, and
a return indication indicating the type of usage of the return value; and
the return indication indicates that either the return value or lack of return value is to be used in protecting media traffic in sending or receiving or both directions as key or as input to a key derivation function to derive a key; and the method further comprises:
determining a plurality of keys from a plurality of values, indications, return values, and return indications;
encrypting media traffic transmitted using one of the plurality of keys; and
decrypting media traffic received using another of the plurality of keys.

12. A method for secure communication, comprising receiving an invite message over a secure signalling path from a sender, the invite message including a key derivation value to be used as input to a key derivation function for deriving at least one key for protecting information for secure communication, or including no key derivation value, the invite message further comprising an indication indicating how the value or the absence of the value is to be used for deriving a master key upon which at least one key for encryption of media traffic encryption is based wherein at least one of the sender and a recipient endpoint select at least one of the indication and a replacement indication to replace the indication from a plurality of modes for deriving one or more keys according to the indication.

13. An apparatus for secure communication, comprising:
at least one processor; and
at least one memory including computer program code,
the at least one memory and the computer program code being configured, with the at least one processor, to cause the apparatus to perform at least the following: to send a an invite message over a secure signalling path to a recipient, the invite message including a key derivation value to be used as input to a key derivation function for deriving at least one key for protecting information for secure communication, or including no key derivation value, the invite message further comprising an indication how the value or absence of value is to be used for deriving a master key upon which at least one key for encryption of media traffic encryption is based wherein at least one of the apparatus and the recipient select at least one of the indication and a replacement indication to replace the indication from a plurality of modes for deriving one or more keys according to the indication.

14. The apparatus in accordance with claim 13, wherein a sender of the message is configured to receive a return message comprising a return message value indicating a return message key for protecting information for secure communication, or a return message key derivation value for deriving at least one key for protecting information for secure communication, the return message further comprising a return message indication indicating the type of usage of the return message value comprised in the return message.

15. The apparatus in accordance with claim 14, wherein the return message indication comprised in the return message indicates at least one of: the return message value is to be used as master key for protecting media traffic to be sent by the sender of the return message, the return message value is to be used as master key for protecting media traffic to be received by the sender of the return message, the return message value is to be used as input to a key derivation function to derive a master key for protecting media traffic to be sent by the sender of the return message or to be received by the sender of the return message, the return message value is to be used as input to a key derivation function to derive master keys for protecting media in sending and receiving directions, no value is provided.

16. An apparatus for secure communication, comprising
at least one processor; and
at least one memory including computer program code, the at least one memory and the computer program code being configured, with the at least one processor, to cause the apparatus to perform at least the following: to receive an invite message over a secure signalling path from a sender, the invite message including a key derivation value to be used as input to a key derivation function for deriving at least one key for protecting information for secure communication, or including no key derivation value, the invite message further comprising an indication how the value or the absence of the value is to be used for deriving a master key upon which at least one key for encryption of media traffic encryption is based wherein at least one of the sender and the apparatus select at least one of the indication and a replacement indication to replace the indication from a plurality of modes for deriving one or more keys according to the indication.

17. The apparatus in accordance with claim 16, wherein the indication indicates at least one of:
the value is to be used as master key for protecting media traffic to be sent by the sender of the message,
the value is to be used as master key for protecting media traffic to be received by the sender of the message,
the value is to be used as input to a key derivation function to derive a master key for protecting media traffic to be sent by the sender of the message or to be received by the sender of the message,
the value is to be used as input to a key derivation function to derive master keys for protecting media in sending and receiving directions, no value is provided.

18. The apparatus in accordance with claim 16, wherein a receiver of the message is configured to return a return message comprising a return message value indicating a return message key for protecting information for secure communication, or a return message key derivation value for deriving at least one key for protecting information for secure communication, the return message further comprising a return message indication indicating the type of usage of the return message value comprised in the return message.

19. The apparatus in accordance with claim 16, wherein the at least one memory and the computer program code are further configured, with the at least one processor, to cause the apparatus to perform at least the following:
to receive a first message which is an invite message which comprises an indication indicating that the value is to be used as an input to a key derivation function to derive a key, and
to send a second message which is a return message, the return message comprising a return message indication indicating that a return message value transmitted in the return message is to be used as an additional input to the key derivation function, whereby the key derivation function is used to derive two different keys to protect traffic in both directions; or
to receive a first message which is an invite message which comprises an indication indicating that the value transmitted in this message is to be used as an input to a key derivation function to derive a key, and
to send a second message which is a return message which comprises a return message indication indicating that a return message value transmitted in the return message is to be used on the one hand as an additional input to the key derivation function to derive a key to protect traffic received by the sender of the return message, and on the other hand as a key to protect traffic received from the sender of the return message; or
to receive a first message which is an invite message which comprises an indication indicating that no value is transmitted in this message, and
to send a second, return message which comprises a return message indication indicating that a return message value transmitted in the return message is to be used as an input to a key derivation function to derive two different keys to protect traffic in both directions; or
to receive a first message which is an invite message which comprises an indication indicating that the value transmitted in this message is to be used as an input to a key derivation function to derive keys to protect traffic in both directions, and
to send a second, return message which comprises a return message indication indicating that a return message value transmitted in the second, return message is to be used as a key to protect traffic sent by the sender of the second, return message, wherein this key is configured to replace the previously derived key for this direction; or
to receive a first message which is an invite message which comprises an indication indicating that the value transmitted in the first message is to be used as a key to protect traffic to be sent to the sender of the first message, and
to send a second message which is a return message which comprises a return message indication indicating that a second return value transmitted in the second, return message is to be used as an input to a key derivation function to derive keys to protect traffic in both directions, wherein one of these keys is configured to replace the key transmitted in the first message.

20. The apparatus in accordance with claim 16, wherein the apparatus is configured to support at least one of early media, forking, retargeting, and multicast in the secure communication.

21. The apparatus in accordance with claim 16, wherein the apparatus is configured to be used in an Internet protocol based multimedia environment using a session initiation protocol.

22. The apparatus in accordance with claim 16, wherein the apparatus is configured to overwrite a key for receiving early media provided in a signaling message or derived from a value provided in a signaling message, by another key provided in an answering signaling message or derived from a value provided in an answering signaling message.

23. The apparatus in accordance with claim 16, wherein the apparatus is at least one of a terminal, mobile station, user equipment, module, and chipset.

24. Computer program product comprising a non-transitory computer-readable storage medium bearing computer program code embodied therein for use with a computer, that, when executed by a computer, performs: sending an invite message over a secure signalling path to a recipient, the invite message including a key derivation value to be used as input to a key derivation function for deriving at least one key for protecting information for secure communication, or including no key derivation value, the invite message further comprising an indication indicating how the value or the absence of the value is to be used for protecting the information for deriving a master key upon which at least one key for encryption of media traffic encryption is based wherein at least one of a sending endpoint and the recipient select at least one of the indication and a replacement indication to replace the indication from a plurality of modes for deriving one or more keys according to the indication.

* * * * *